Feb. 11, 1941.　　D. A. MACDONALD ET AL　　2,231,853
TIRE BUILDING APPARATUS
Filed April 17, 1937　　7 Sheets-Sheet 1

INVENTORS
DONALD A. MACDONALD
BY CORNELIUS M. O'DONOHOE
ATTORNEYS

Feb. 11, 1941. D. A. MACDONALD ET AL 2,231,853
TIRE BUILDING APPARATUS
Filed April 17, 1937 7 Sheets-Sheet 2

INVENTORS
DONALD A. MACDONALD
CORNELIUS M. O'DONOHOE
BY
ATTORNEYS

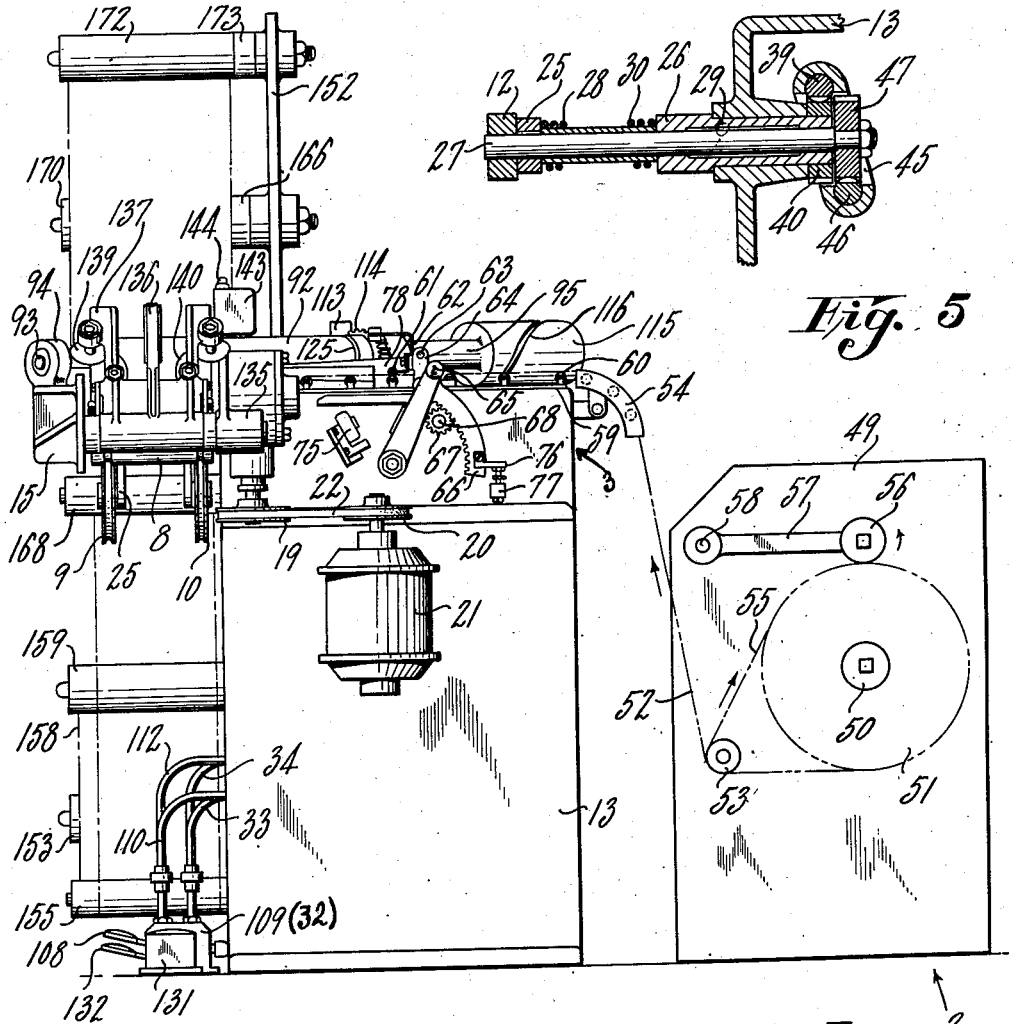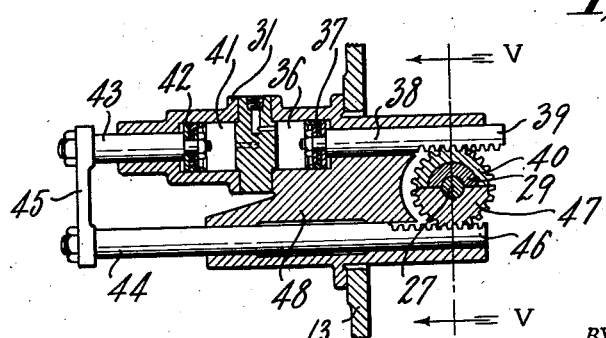

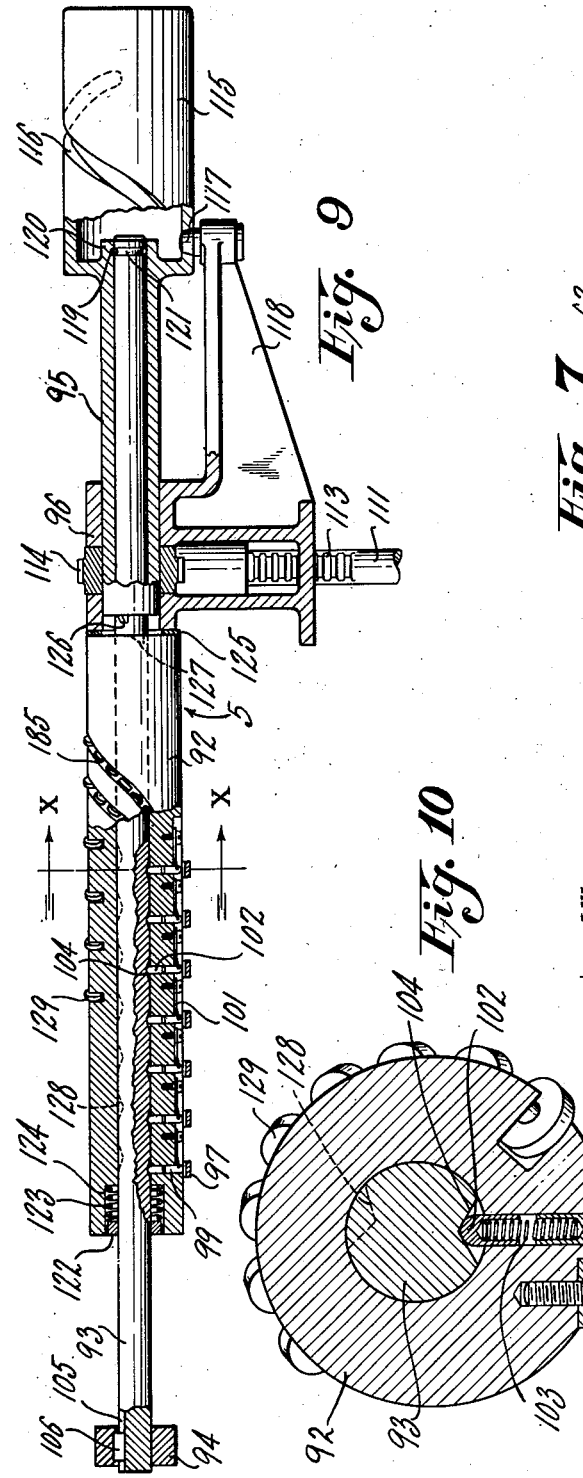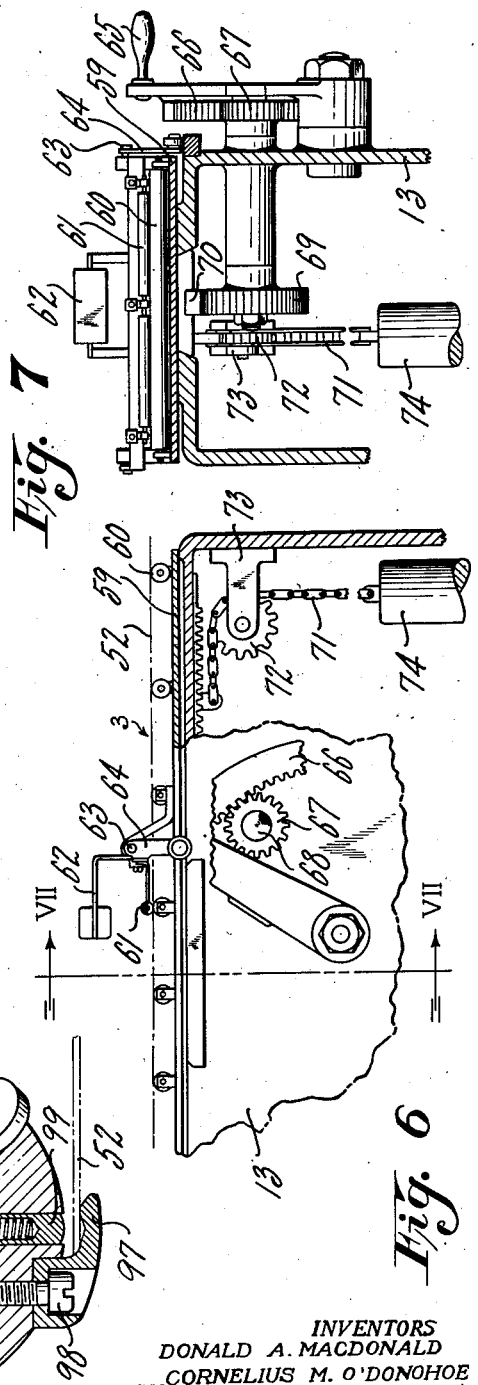

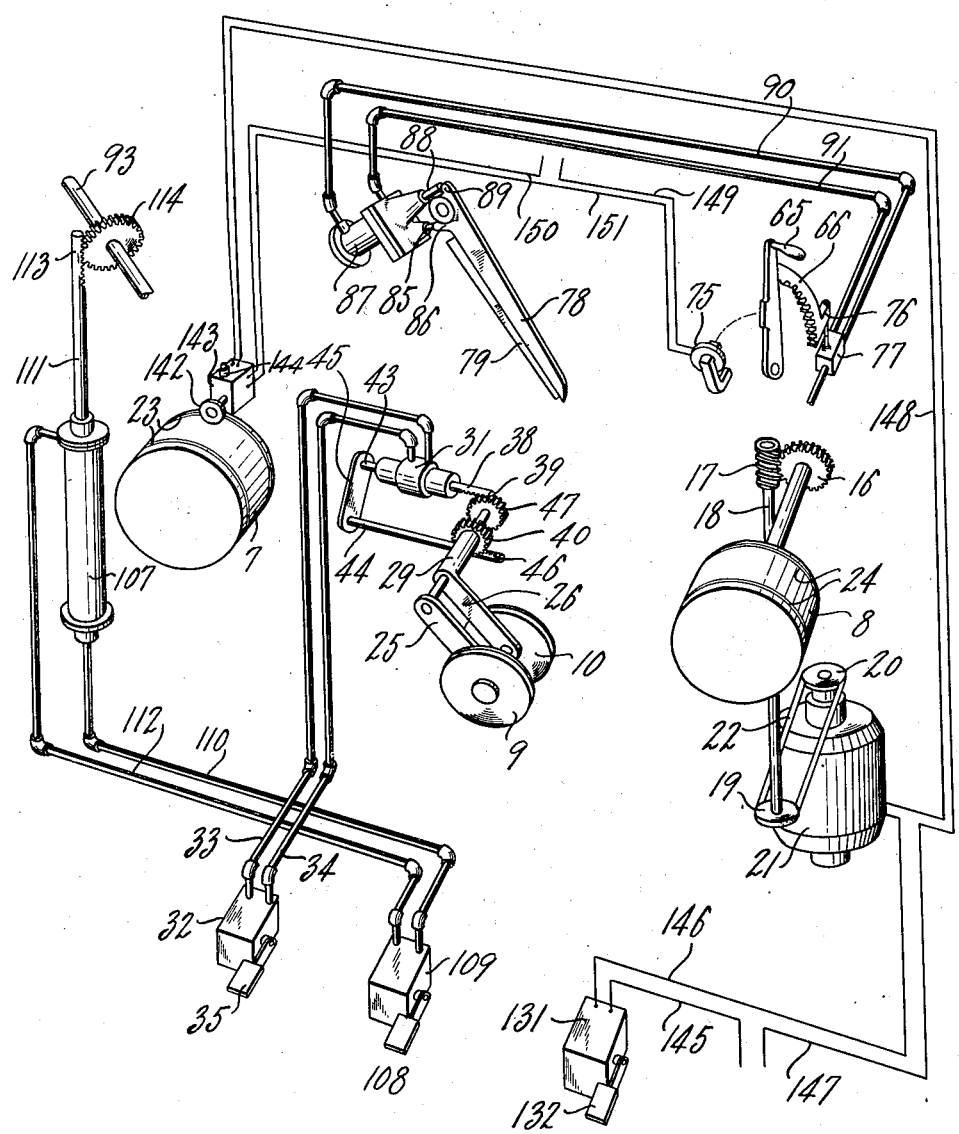

Patented Feb. 11, 1941

2,231,853

UNITED STATES PATENT OFFICE 2,231,853

TIRE BUILDING APPARATUS

Donald A. Macdonald and Cornelius M. O'Donohoe, Indianapolis, Ind., assignors, by mesne assignments, to United States Rubber Company, New York, N. Y., a corporation of New Jersey Application April 17, 1937, Serial No. 137,445

30 Claims. (Cl. 154—10)

This invention relates to pneumatic tires, and in particular it relates to apparatus for automatically assembling the various elements of pneumatic tires. Essentially, the invention consists of two drums spaced apart, adaptable for supporting tire components looped around the drums, in somewhat the manner of pulleys supporting a belt. Means is also provided for feeding fabric plies from a position parallel to the axes of the drums to a position tangent to one drum in the area engaged by the tire elements as they extend around the drum.

An object of the invention is to provide increased efficiency in the manufacture of pneumatic tires. This is attained by increasing the production output per tire building unit, by accomplishing greater uniformity of product, by permitting greater production relative to the manufacturing area or floor space and thereby facilitating stock concentration, by reducing manual labor, and by reducing errors attributed to manual operations.

A conventional method of building pneumatic tires is to assemble the various elements of a tire on a building drum in substantially pulley band shape. Thereafter the tire is shaped and vulcanized.

In the manufacture of tires on a conventional building drum certain difficulties are encountered. For example, the various elements of the tire must be applied, one on top of the other, until the tire carcass is completed. In accordance with the practice of our invention, the various tire elements need not be applied in this order, but certain of the elements may be subsequently assembled beneath other elements of the tire carcass. Such an arrangement is of particular advantage when it is considered that the various plies of a tire must be folded around the bead wires. By permitting the fabric plies to be assembled both underneath and on top of the bead wires, various automatic methods of anchoring the fabric with the bead wires are possible, thereby eliminating much of the manual labor heretofore needed in the assembling of tire bands.

A further feature of the invention is that the fabric and other component parts of the tire may be readily assembled with the supporting beads on a building drum, and the completed tire band may be easily removed from the drum. Furthermore, the proper degree of tension to be imparted circumferentially to the carcass may be readily controlled. Also, our apparatus is more adaptable to various methods of assembling tire elements.

These and other objects and advantages will appear more fully in the following detailed description, when considered in connection with the accompanying drawings, in which:

Fig. 3 is an end elevational view thereof;

Fig. 4 is an enlarged longitudinal view, in section, of a sheave tensioning device, taken along lines IV—IV of Fig. 1, the fabric positioning means being omitted;

Fig. 5 is a transverse view, in section, of tension applying means, taken along lines V—V of Fig. 4;

Fig. 6 is a side elevational view, partly in section, of a portion of the apparatus, illustrating a ply advancing means;

Fig. 7 is a transverse view, in section, of the ply advancing means, taken along lines VII—VII of Fig. 6;

Fig. 8 is an enlarged longitudinal view, in section, of a fabric cutting means, taken along lines VIII—VIII of Fig. 1;

Fig. 9 is a longitudinal view, partly in section, of means for feeding a ply to the tire assembly;

Fig. 10 is an enlarged transverse view, in section, of the ply feeding means, taken along lines X—X of Fig. 9;

Fig. 11 is a diagrammatic view in perspective, illustrating the relative function of the principal operating elements.

While the drawings illustrate an embodiment of an apparatus for manufacturing a two-ply pneumatic tire, it is to be understood that the apparatus may be adapted for building tires having more than two plies, and that the various tire components may be arranged to form a tire carcass in accordance with various assembling methods for arranging the additional plies.

Figure 1:
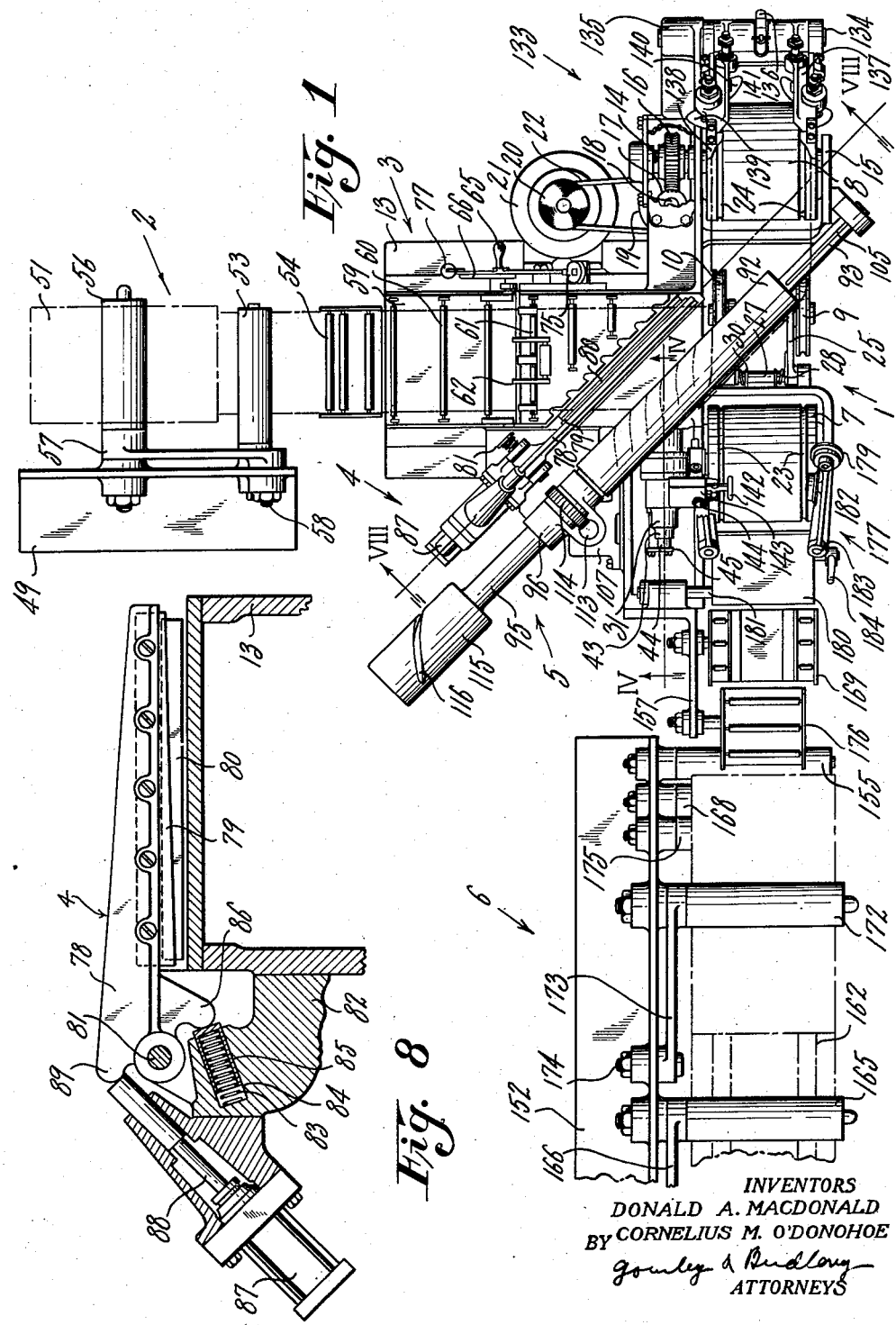
Fig. 1 is a plan view of apparatus for practicing our invention.
Figure 2:
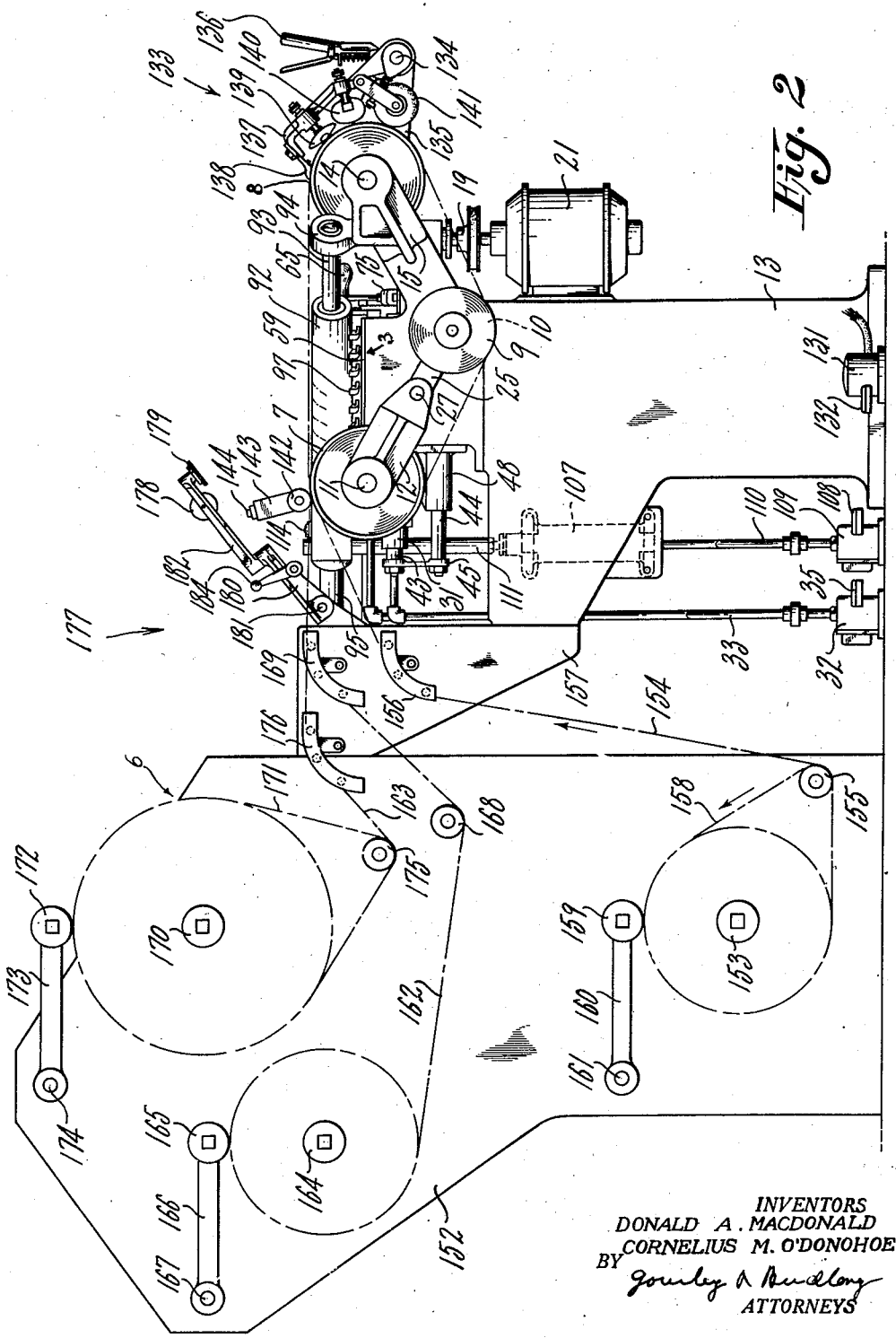
Fig. 2 is a front elevational view thereof.

Referring to the drawings, and in particular to Figs. 1 and 2, the principal divisions of the apparatus are a tire building support 1, a fabric storage rack 2, fabric advancing means 3, a fabric cutting device 4, fabric positioning means 5, and a stock storage rack 6.

Tire building support

Essentially, the tire building support 1 comprises pulleys 7 and 8, and sheaves 9 and 10 (Fig. 2). These pulleys and sheaves form a triangular outline, the circumference of which describes the position of the carcass as it is assembled on the supports. The pulley 7 is rotatably mounted on a shaft 11 supported by a bracket 12 at one end and supported by a main frame 13 at the other end. The pulley 8 is keyed to a shaft 14 rotatably mounted in a bracket 15 extending from the main frame 13. A worm wheel 16 (Fig. 1) secured to the shaft 14 engages with a worm gear 17 keyed to a shaft 18. A sheave 19 attached to the shaft 18 connects with a sheave 20 on a motor 21 through a belt 22. In this manner, a drive is provided for rotating the pulley 8. Means for controlling the motor 21 will be described hereinafter. With this assembly space is provided outside of the triangle formed by drums 7 and 8, and sheaves 9 and 10 for the application and removal of bead wire and tire bands, respectively.

The pulleys 7 and 8 are provided with grooves 23 and 24, respectively, for the purpose of positioning bead wires which form component parts of the tire carcass. The sheaves 9 and 10 are located in the same plane as the grooves 23 and 24, so that the bead wires when positioned in the grooves 23 and 24 are in proper alignment with the sheaves 9 and 10.

The purpose of the sheaves 9 and 10 is to apply tension to the bead wires during the tire building operation. They also permit the assembly and removal of the bead wires relative to the drums 7 and 8. This is accomplished by mounting the sheaves on pivotal arms 25 and 26. The arm 25 is keyed to a shaft 27 (Figs. 1 and 5), and a spring 28 acting upon the arm 25 against the bracket 12 maintains the arm in its normal contracted position. A sleeve 29 rotatably fitting over the shaft 27 forms a part of the hub of the arm 26. A spring 30 engaging with the arm 26 and bracket 12 also operates to maintain the sheave 10 in a contracted position. The shaft 27 is supported at one end by the bracket 12 (Figs. 2 and 5), while at the other end it is supported from the frame 13 through the sleeve 29 (Fig. 5). When bead wires are assembled on the supports, manual means are operated for moving the sheaves 9 and 10 to an extended position, thereby applying tension to the bead wires during the tire building operation.

Means for actuating the sheaves 9 and 10 to an extended position comprises a double fluid operating cylinder 31 (Figs. 2 and 11) controlled by a three-way foot actuated valve housing 32. Conduits 33 and 34 connect the fluid operating cylinder 31 with the valve housing 32. When the foot pedal 35 of the valve housing 32 is actuated, fluid is introduced into a chamber 36 (Fig. 4) of the fluid operating cylinder 31. Within the cylinder 31 is a piston 37 and piston rod 38. The outer end portion of the rod 38 is in the form of a rack which meshes with a gear 40 keyed to the sleeve 29. Therefore, the first movement of the foot pedal 35 results in an outward arcuate movement of the sheave 10. This outward movement is limited by engagement with the innermost bead wire positioned around the supports.

A second movement of the foot pedal 35 (Fig. 2) results in fluid pressure being introduced into the chamber 41 (Fig. 4) of the fluid operating cylinder 31. Within this chamber a piston 42 connects with a piston rod 43. This movement is communicated to a rod 44 through a link 45. A rack 46 at one end of the rod 44 meshes with a gear 47 keyed to the shaft 27. Therefore, through actuation of the piston 42 rotary movement is transmitted to the shaft 27, causing the sheave 9 to swing with the shaft 27 and apply tension to the outermost bead wire positioned on the supports.

The cylinder 31 and its associated mechanism are guided and supported by a housing 48 fastened to the frame 13. When it is desired to release the sheaves 9 and 10 from engagement with the bead wires the foot pedal 35 is actuated a third time, the result of which cuts off the source of fluid pressure communicating with the chambers 36 and 41, and also opens these chambers to the atmosphere. The springs 28 and 30 (Fig. 5) thereafter return the sheaves 9 and 10 and the pistons 37 and 42 (Fig. 4) to a contracted position.

*Fabric storage rack*

As shown in particular in Fig. 3, a fabric storage rack 2 is provided for supplying fabric in continuous strip form to the supports. This storage rack 2 is of a simplified conventional form, and consists essentially of a frame 49 on which is mounted stock roll 50 carrying a roll of fabric 51.

Tire fabric 52 is withdrawn from the roll 51. The fabric 52 passes around a guide roller 53, and over a series of rollers 54 which position the fabric in proper relation with the fabric advancing means 3. A liner 55, which is customarily interposed between the convolutions of tire fabric 52, is also withdrawn from the roll 51, passes around guide roller 53, and is wound upon a liner roll 56. The liner roll 56 is rotatably mounted on an arm 57 pivoted at 58 to the frame 49.

The type of stock storage device as thus described is illustrative of a source of supply of ply fabric. However, it is to be understood that various types of fabric storage devices may be substituted for that disclosed herein. It should also be understood that the fabric storage rack may be equipped with various conventional automatic devices for relieving tension in the fabric stock before it is acted upon in subsequent operations.

The fabric 52 is utilized as the first ply of the tire assembly. It is preferable that the source of supply of this fabric be so positioned that a strip of fabric will extend in a plane substantially parallel to the axes of the pulleys on which the tire carcass is built. The object of thus positioning the fabric is to permit the first ply to approach the tire building pulleys in such manner that a ply may be positioned on top of the building pulleys but underneath the bead wires which have been previously assembled on the pulleys 7 and 8. It is therefore desirable that the first ply approach the building pulleys laterally and in a plane substantially beneath the circumferential plane of the tire carcass between the drums.

*Fabric advancing means*

As the first ply fabric 52 leaves the fabric storage rack, it engages with the fabric advancing means 3. This means is particularly shown in Figs. 1, 3, 6, and 7. Essentially, the advancing means consists of a table 59 (Fig. 6) supporting a plurality of horizontal rollers 60 extending transversely of the fabric ply 52. The table 59 is in the form of a carriage, and rests upon the main frame 13. A pressure roller 61 is positioned above one of the rollers 60 and is attached to a weighted bracket 62 pivotally mounted at 63 to a support 64. The purpose of the tension roller 61 is to prevent movement of the fabric 52 relative to its supporting rolls while the carriage is being advanced.

A hand lever 65 (Figs. 6 and 7) is provided as a manual means for controlling advancement of the carriage 59. Attached to the lever 65 is a gear segment 66 which meshes with a gear 67 keyed to a shaft 68. Also keyed to the shaft 68 is a gear 69 which meshes with a rack 70 (Fig. 7) secured to the under side of the carriage 59. A forward movement of the hand lever 65 results in an advancement of the carriage 59.

Normally the carriage 59 remains in a retracted position, which is effected by means of a chain 71 (Fig. 6) attached to the under side of the carriage 59. This chain 71 meshes with a sprocket 72 supported by a bracket 73 attached to the main frame 13, and a weight 74 attached to the end of the chain 71 normally urges the carriage 59 to its receded position.

As the hand lever 65 is moved to its forward position the lever contacts with a magnetic coil 75 (Fig. 3) supported from the side of the main frame 13. The object of the magnetic coil 75 is to hold the hand lever 65 and the carriage 59 in its advanced position until the fabric is engaged by a subsequent stock manipulating device. Means for releasing the manual lever 65 by cutting off the current leading to the magnetic coil 75 will be described hereinafter.

A bracket 76 (Fig. 3) attached to the end of the gear segment 66 is positioned in such manner that it will engage with and actuate an air valve 77 upon the return stroke of the hand lever 65. The description of the subsequent operation will explain the result of actuation of the air valve 77.

*Fabric cutting device*

The present invention includes means for measuring a ply to form a tire component or ply strip of proper length, and cutting the ply diagonally in accordance with customary methods of severing plies for tire fabrics.

The cutting device is shown in particular in Figs. 1 and 8. The carriage 59 of the fabric advancing means moves the fabric into the path of a knife 78 (Fig. 8) carrying a blade 79. In complementary association with the knife blade 79 is a shearing bar 80 attached to the top of the frame 13. Knife blade 78 is pivoted at 81 to a bracket 82 extending from the side of the frame 13.

Normally the knife 78 is pivoted upwardly so as not to interfere with the fabric as it is advanced between the knife blade and shearing bar. The upward position of the knife 78 is maintained by a spring 83 located in a cavity 84 in the bracket 82. A plunger 85 is slidable in the cavity 84 and engages with a projection 86 extending from the knife 78.

The knife blade is actuated into shearing position by a fluid operating cylinder 87 attached to the bracket 82. A piston rod 88 extending from the cylinder 87 engages with a projection 89 forming a part of the knife 78. Admission of fluid under pressure to the cylinder 87 causes the piston rod 88 to move to an extended position, thereby forcing the knife blade 79 into cutting position with the shearing bar 80. Introduction of fluid under pressure to the cylinder 87 is accomplished automatically by the actuation of the fluid operating valve 77 (Fig. 3).

As shown more particularly in Fig. 11, the backward movement of the hand lever 65 causes the bracket 76 to engage with and actuate the fluid pressure operating valve 77. Actuation of this valve permits fluid pressure to pass through conduit 90 to the cylinder 87, thereby moving the piston 88 to an extended position and causing the knife blade 79 to descend upon the fabric 52. The rear end of the fabric is withdrawn by the subsequently described mechanism. The new leading fabric edge rests on table 59 behind the bar 80 ready for a subsequent forward movement.

When the hand lever is manually moved to its forward position, the bracket 76 disengages with the fluid operating valve 77 and opens a conduit 91 connecting the valve 77 and cylinder 87 to the atmosphere. Thereafter the spring 83 acts upon the knife 78 to pivot same in its normal upward position.

The length of the ply or the cycle between successive cuts of the knife 78 is determined by the return stroke of the hand operated lever 65 from the magnetic coil 75 to the valve 77 and by the de-energization of coil 75. Circuits for effecting the breaking of the current to the magnetic coil 75 will be described hereinafter.

*Fabric positioning means*

Means is provided for gripping the leading marginal end portion of the fabric 52 and positioning it in tangential relation with the building pulley 8. This fabric positioning means 5 is particularly shown in Figs. 1, 9, and 10. Essentially, the fabric positioning means comprises an eccentric roller 92 located in parallel relation with the knife assembly 4, and adaptable for axial and rotary motion. Roller 92 is mounted on a shaft 93 supported at one end by a bearing 94 attached to the bracket 15. The opposite end of the shaft 93 is supported by a sleeve 95 rotatably mounted in a bracket 96 fastened to the top of the frame 13.

A plurality of fingers 97 (Fig. 10) extend from the lower portion of the roller 92, and are secured thereto by means of machine screws 98. The fingers 97 are so positioned as to form a recess for the reception of the leading marginal edge of the fabric 52 in the fully advanced position to table 59. The roller 92 and fingers 97 are so located that the recess formed by the fingers is in substantially the same plane as the fabric 52 resting upon the advancing means 3.

When the hand lever 65 is moved to its forward position, thus actuating the fabric advancing means, the fabric 52 passes under the fabric cutting device, and the end moves into position in the recess formed by the fingers 97. This is shown in dot-and-dash lines in Fig. 10.

In order to clamp the fabric 52 against the fingers 97, a plunger 99 in alignment with each finger 97 is slidable within a bore 100 in the roller 92 and is adapted to engage the fabric. A flat spring 101 (Fig. 9) maintains each plunger 99 out of contact with the fabric 52 unless the plunger is acted upon by a direct force. This prevents the fabric 52 from being crushed. A cam plunger 102, also slidable within each bore 100, permits transmission of movement from the plunger 102 to the plunger 99 through a spring 103. The cam plungers 102 are positioned in contact engagement with the surface of a depression 104 in the shaft 93. This depression acts as a cam for actuating the plungers 102 during movement of the shaft 93 relative to the roller 92, the shaft 93 being restricted to axial movement only. To maintain this axial movement a keyway 105 in shaft 93 engages with a key 106, permanently attached to the bearing 94.

Actuation of the shaft 93 is produced by a pneumatic cylinder 107 (Figs. 2 and 11). Manual means for controlling this cylinder is effected by a foot pedal 108 connected with a fluid operating valve 109. A conduit 110 connecting the valve 109 with the cylinder 107 permits fluid to enter the cylinder 107, thereby actuating a piston rod 111. A second conduit 112 connecting the opposite end of the cylinder 107 with the valve 109 reverses the movement of the piston rod 111.

A rack 113 (Fig. 11) formed at one end of the piston rod 111 meshes with a gear 114 slidably keyed to the sleeve 95 (Fig. 9). Reciprocal movement of the piston rod 111 results in rotary movement of the sleeve 95. At the outer end of the sleeve 95 is a cam 115 having a spiral groove 116 formed therein. A cam follower 117, supported by a bracket 118 on the main frame 13, engages with the spiral groove 116.

As the sleeve 95 is rotated by movement of the piston rod 111, the sleeve, being restricted in its movement due to the cam action, moves axially in a spiral path about shaft 93. The shaft 93 also moves axially with the sleeve 95, but does not rotate due to its keyed relation with the bearing 94. Axial movement from the sleeve 95 to the shaft 93 is transmitted through a pin 119 extending through a hub 120 forming part of the cam 115. A groove 121 in the shaft 93 at this point permits relative rotary motion between the shaft 93 and the sleeve 95, but prevents relative axial movement therebetween.

The roller 92 (Fig. 9) is not secured fixedly to the shaft 93. Its relation to shaft 93 is normally maintained by means of a collar 122 pinned to the shaft 93, thus providing a backing for a spring 123 retained within a bore 124 at one end of the roller 92. The spring 123 exerts a pressure against the roller 92 to hold it under pressure against a friction washer 125 held stationary against the hub of the bracket 118.

As the piston rod 111 begins to move upwardly, the sleeve 95 is rotated in a spiral path. In the first stage of this operation the axial movement resulting from the spiral travel of the sleeve 95 is transmitted to the shaft 93. As a result of this axial movement, the shaft 93 moves axially in relation to the roller 92. When this occurs, the plungers 102 (Fig. 10) move out of the cam depressions 104 in the shaft 93, causing the plungers 99 to move radially outwardly from the rollers 92 to clamp the fabric 52 against the fingers 97.

As the sleeve 95 continues its spiral movement, a dog 126 (Fig. 9) located at the end of the sleeve 95 engages with an indentation 127 at the end of the roller 92. After this movement is made, the spiral movement of the sleeve 95 is transmitted to the roller 92. The plungers 99 and the clamping fingers 97 retain their grip on the fabric 52, thus carrying the fabric along with the spiral movement of the roller 92. In this operation the radial movement of the roller 92 is greater than 180 degrees. When the roller 92 rotates a little over 180 degrees, the plungers 102 drop into cam cavities 128 (Fig. 10) in the shaft 93, thus releasing the fabric 52 from the clamping fingers 97. The roller 92 continues to rotate until the fingers 97 are in such position that they will be out of the way of the fabric 52 after it is transferred to the under side of the preferably tacky surfaces of the bead wires passing around the pulleys 7 and 8. A plurality of rollers or discs 129 (Figs. 9 and 10) are rotatably mounted in spiral grooves 185 in the roller 92 for the purpose of facilitating movement of the fabric 52 when it is carried by the tire building pulley 8 around the roller 92.

As shown in Fig. 2, the top of the roller 92, in its normal or fabric gripping position, is located at an elevation relative to the pulleys 7 and 8, slightly lower than a line extending tangentially from the top of the pulley 7 to the top of the pulley 8. This is desirable so that the roller 92 will not interfere with the tire carcass as it is built upon the pulleys 7 and 8.

When the eccentric roller 92 is moved radially about 180 degrees the fabric 52 is brought into tight contact engagement with the under side of previously applied tire bead wires.

The roller 92 is permitted to remain at the delivery or fabric releasing end of its stroke until retracted in a subsequent operation. When it is retracted the operator manually actuates the foot pedal 108, thus causing the piston rod 111 to recede within the cylinder 107. This reverse movement causes the sleeve 95 to move in a spiral path to its original starting position.

*First ply assembly*

Figure 12:
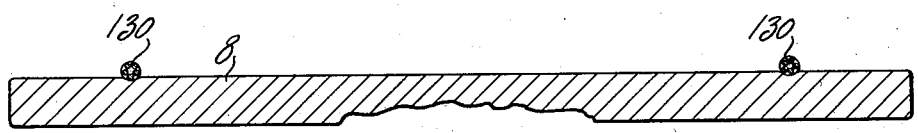
Figs. 12 to 19, inclusive, are diagrammatic views, illustrating a portion of a building drum, in section, in relation to the various tire elements that are formed thereon in various stages of the tire assembly.

Prior to the application of the first ply, bead wires 130 (Fig. 12) are assembled in the grooves 23 and 24 in the pulleys 7 and 8, respectively. These bead wires also pass around sheaves 9 and 10 which, being pivotally mounted, apply pressure against the bead wires during the assembly of the tire carcass.

Figure 13:
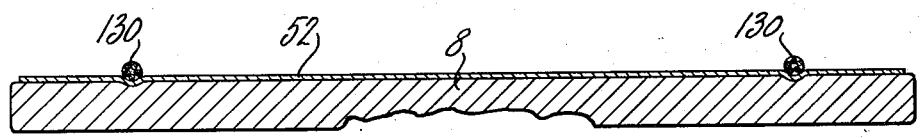

As the fabric 52 is brought into position by the roller 92, the surface of the fabric engages directly with the bead wires 130 (Figs. 2 and 13). The surfaces of both the fabric 52 and the bead wires 130 are of a tacky nature. Therefore, the fabric 52 readily adheres to the under side of the bead wires 130 and is drawn between them and the pulley 8. Before the roller 92 which holds the fabric 52 against the bead wires 130 is retracted, the building pulley 8 is rotated, thus moving the fabric 52 around the roller 92 and on to the drum 8 underneath the bead wires 130.

The motor 21 (Figs. 2 and 11) for driving the pulley 8 is controlled from a switch 131 operated by a foot pedal 132. The motor 21 is operated only when the foot pedal 132 is held in operating position. If desired, the release of the foot pedal 132 may be coupled with braking means (not shown) for preventing continued movement of the drum 8 due to momentum of the driving mechanism.

During rotation of the building pulley 8, the marginal portions of the fabric ply 52 (Figs. 14 to 18) are turned around the bead wires 130 and are stitched down in that relation. This is accomplished by a stitching unit 133 (Fig. 2) which is pivoted at 134 to a bracket 135 extending from the frame 13. A hand lever 136 permits the stitching unit to be manually moved into or out of engagement with the building pulley 8.

Figure 14:
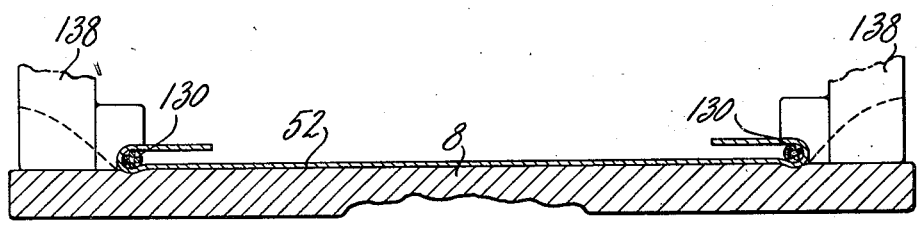
Figure 15:
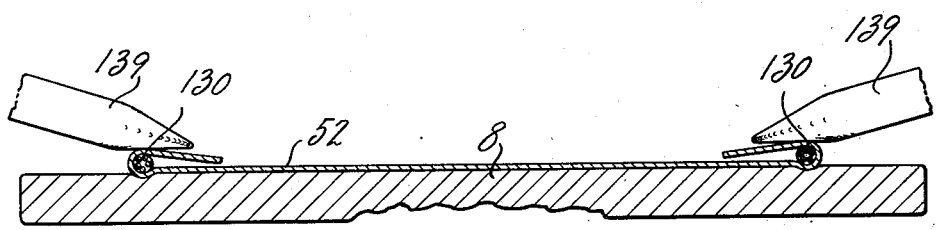
Figure 16:
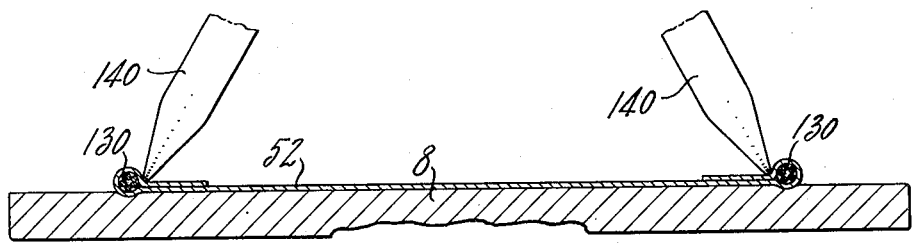
Figure 17:
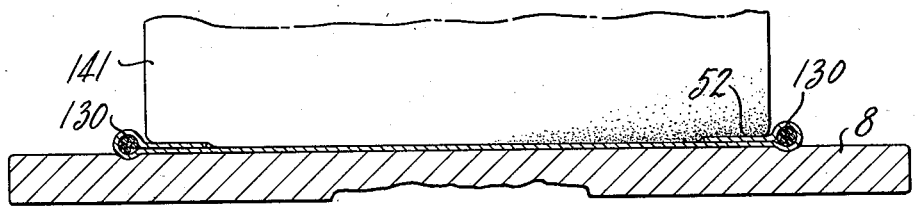
Figure 18:
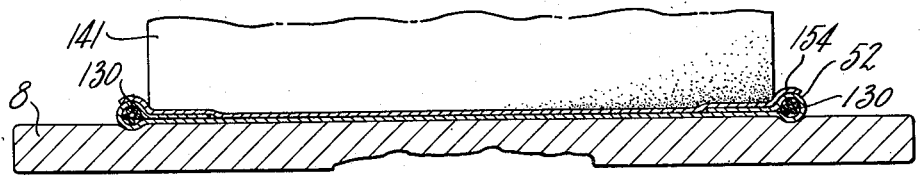

From a bracket 137 forming the frame of the stitching unit 133 a plow 138 is attached in such manner as to connect substantially with the surface of the pulley 8. The purpose of this plow, as shown in Fig. 14, is to fold the marginal portions of the fabric 52 around the bead wires 130.

Following the plow is a disc 139 (Figs. 2 and 15) rotatably mounted on the frame 137. This disc stitches the fabric on top of the bead wires 130 and further assists in turning the marginal portions of the fabric around the bead wires 130. A second stitching disc 140 (Figs. 2 and 16), also rotatably mounted on the frame 137, stitches the marginal portion of the fabric 52 which lies close to the bead wires 130. A finishing stitcher 141 (Figs. 2 and 17), pivotally mounted on the frame 137, engages with the assembled ply, and rolls same in compact relation. This stitcher roll 141 is composed of resilient material such as rubber, thereby permitting it to assume the contours of various irregularities in the assembled components of the tire carcass.

After the first ply fabric 52 (Fig. 2) is carried along the building pulley 8, it passes around the sheaves 9 and 10 and on to the building pulley 7. When the end of the first ply stock 52 approaches the top of the building pulley 7 it engages with a trip roller 142 pivotally communicating with an electrical switch box 143. The switch box itself is pivotally connected to the frame 13. As the trip roller 142 is actuated it cuts off the current leading both to the motor 21 and to the magnetic coil 75. These connections are shown in particular in the diagrammatic Figure 11.

Upon actuation of the trip roller 142, the motor 21 stops and the magnetic coil 75 releases its engagement with the hand lever 65, whereupon the lever 65 returns to its normal position by means of the return weight 74 (Fig. 6). As the hand lever 65 (Figs. 3 and 11) reaches its return stroke, the bracket 76 extending from the gear segment 66 forming a part of the hand lever 65 actuates the fluid operating valve 77. This valve controls the fabric cutting unit 4, and by this actuation the cutting blade 79 descends and severs the fabric 52. The location of the fabric cutting unit 4 relative to the tire building supports and the cycle of its operation determine the length of the fabric 52 constituting the first ply. Thereafter the operator swings the switch box 143 (Figs. 2 and 11) on its pivot, thus bringing the trip roller 142 out of engagement with the tire carcass. At the same time the operator presses a button 144 located at the top of the switch box 143, with the result that the trip roller 142 is reset and the electrical connections between the motor 21 and the magnetic coil 75 are completed.

The operator next actuates the foot pedal 132 for starting the motor 21 to move the remainder of the ply on to the tire building supports. At this cycle of operation the operator may actuate the foot pedal 108 for moving the roller 92 back to its normal position.

*Control circuits*

An example of suitable wiring connections between the motor 21, magnetic coil 75, and associated switch boxes 131 and 143, is diagrammatically illustrated in Fig. 11. Line 145 leads from a source of energy to the switch box 131 wherein a circuit may be completed with line 146 extending to the motor 21. A second line 147, also leading from a source of energy, completes the circuit to the motor 21; however, the circuit in the latter line is subject to be broken within the switch box 143. A line 148 forms an indirect continuation of the line 147 from the switch box 143 to the motor 21.

The wiring which forms the circuit to the magnetic coil 75 is independent of the circuit for operating the motor 21. A line 149 leads from a source of energy to the magnetic coil 75. A second line 150 leads from a source of energy to the switch box 143, and then in the form of line 151 extends to the magnetic coil 75. The only function of the switch box 143 is to break the circuit of the magnetic coil 75 and motor 21 during the application of the first ply. Thereafter the button 144 resets the circuits and the motor 21 is operable through the switch box 131.

While we have shown electrical circuits in a simplified form, it is to be understood that the circuit may be improved in various ways. For example, relays may intercept the circuits, and automatic means may be included for braking the motor by causing a change in the circuit, tending to reverse the direction of rotation of the armature.

*Stock storage rack*

Means for supplying additional materials to the tire building supports is provided in the form of the stock storage rack 6. This rack consists generally of a frame 152 (Fig. 2) adapted to hold rolls of stock in tangential relation with the tire building support. A roller 153 extending from the frame 152 supports a roll of fabric 154 which in the present tire building operation forms the second ply of the carcass assembly. From the roller 153 the fabric 154 passes around a roller 155 and over a guide frame 156 attached to a bracket 157 extending from the main frame 13. In this position the fabric 154 is in receptive location for assembly with the tire carcass.

A liner 158 which separates the convolutions of the roll of fabric 154 is separated from the fabric at the roller 155 and is wound up on a roller 159 mounted on an arm 160 which is pivoted at 161 to the frame 152.

In addition to the second ply fabric 154, the stock storage rack also supplies chafing strips 162 and a tread 163. The chafing strip stock 162 is wound upon a roller 164 between convolutions of a liner which is rewound upon a roller 165 rotatably attached to an arm 166 pivotally connected at 167 to the frame 152. The chafing strip stock 162 passes around the positioning roller 168 and on to the guiding devices 169 attached to the bracket 157.

The tread stock 163 is supplied in the form of a roll wound upon a roller 170 extending from the frame 152. When the tread stock 163 is withdrawn from the roller 170 a liner 171 which separates the convolutions of the tread stock is rewound upon a roller 172 rotatably attached to an arm 173 pivotally mounted at 174 to the frame 152. A positioning roller 175 and a guiding device 176 locate the tread stock 163 in proper relation with the tire building support.

Figure 19:
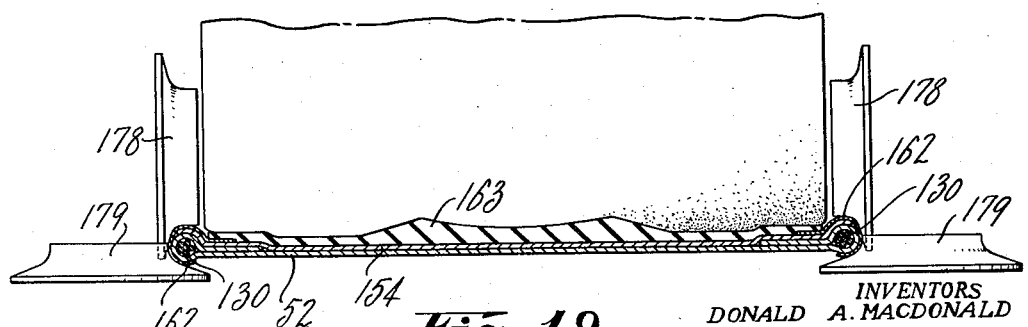

The guiding device 169 for the chafing strip stocks 162 and the guiding device 176 for the tread 163 are located in such relative position that the chafing strip stocks 162 become attached to the marginal portions of the tread stock 163 before they are applied to the tire carcass. The assembled relation of the tread 163 with the chafing strips 162 is shown particularly in Fig. 19.

The stock storage rack as thus described is a simplified form, shown principally for the purpose of illustration. It should be understood that various forms of stock storage devices may be substituted for the embodiment disclosed herein, and that such devices may contain automatic mechanism for supplying the stock relatively free and without tension.

*Second ply application*

When the first ply 52 is completely assembled with the bead wires 130, the tire building assembly is prepared for the application of the second ply 154. This preparation consists in actuation of the hand lever 136 (Fig. 2) which operates to swing the stitcher unit 133 partially out of engagement with the tire building pulley 8. The plow 138 and stitchers 139 ad 140 are moved away from the surface of the building pulley 8 in this operation. The stitcher roll 141, however, remains in contact engagement with the pulley 8.

As previously described, the switch box 143 is moved on its pivotal support out of engagement with the building pulley 7. The tire building support is now in receptive position for application of the second ply.

An end of the second ply 154 normally hangs over the end of the guiding device 156 (Fig. 2). The end portion of this ply is manually grasped by the operator and positioned in proper relation on top of the assembled first ply. The leading portion of the second ply, because of its tacky nature, readily adheres to the first ply. Thereafter the operator actuates the foot pedal 132 for operating the motor 21. As a result, the second ply fabric 154 is withdrawn from the stock storage rack, and is wrapped circumferentially around the tire building supports.

When one revolution of the carcass is completed, the operator causes the tire building supports to stop rotating, and with manual means such as a pair of shears cuts the second ply diagonally, leaving a small marginal portion for the purpose of overlapping the opposite end of the same ply.

During the circumferential movement of the second ply the stitching roller 141 rolls the second ply in compact engagement with the first ply. Additional fabric plies could be applied by the same procedure and duplicated storage facilites.

*Thread and chafing strip application*

As previously described, the chafing strips 162 and the tread 163 are assembled in proper relation with each other before they are applied to the tire carcass. Therefore, this material is applied in the form of a single strip of stock.

The end portions of these stocks hang over the end of the guiding device 169 (Fig. 2). From this position the operator manually grasps the end portion of the stock, and unites it in adhesion and on top of the second ply.

In the next operation the stitching unit 177 (Fig. 2) is pivotally moved into position relative to the tire carcass assembled on the supports 7 and 8. The engaged position of the stitching unit 177 is diagrammatically illustrated in Fig. 19 which shows stitching discs 178 and 179 in contact relation with the carcass assembly. The stitching unit 177 (Fig. 2) includes arms 180 pivotally mounted at 181 to the bracket 157. Additional arms 182 pivoted at 183 to the arms 180 permit lateral adjustment of the stitching discs 178 and 179 relative to the tire carcass. A hand lever 184 connected to one of the arms 180 controls lateral movement of the arms 182 through a cam movement (not shown) associated with the hand lever 184.

The motor 21 is again actuated, and the stocks 162 and 163 are withdrawn from the storage rack until a complete revolution of the stock is made around the circumference of the tire building supports. The operator causes the tire building supports to stop rotating, and by means such as the hand operated shears severs the stocks 162 and 163. Thereafter the ends of these stocks are joined in butt relation. The operator causes the tire building supports to rotate until all of the elements have been stitched by the roller 141, and the stitching discs 178 and 179. This completes the tire assembly operation.

The stitching unit 177 is thereafter moved out of engagement with the tire carcass, the stitching unit 133 is also moved still further from engagement with the supporting pulley 8 so as to move the stitching roller 141 out of contact with the carcass.

The foot pedal 35 is manually actuated, causing the sheaves 9 and 10 to move inwardly and out of engagement with the carcass. The carcass is now free from any attachment to the tire building supports, and it may be readily removed axially from the tire building supports.

To start the building of another tire, tire beads 130 are applied as previously described, the stitching unit 133 is moved into engagement with the pulley 8, and the switch box 143 is swung on its pivot into position relative to the tire building pulley 7. Thereafter the various plies may be assembled in a similar cycle of operation.

While we have shown and described a present preferred embodiment of our invention, it will be understood that modifications may be made therein without departing from the spirit of the invention and the scope of the appended claims.

Having thus described our invention, what we claim and desire to protect by Letters Patent is:

1. In a tire building machine, spaced supports for receiving tire elements, means on the supports for locating certain of the tire elements, and means for applying additional tire elements to the spaced supports between said supports and previously applied tire elements.

2. In a tire building machine, spaced supports for receiving tire elements, means on the supports for locating certain of the tire elements, and means for applying additional tire elements circumferentially to the spaced supports between said supports and previously applied tire elements.

3. In a tire building machine, spaced supports for receiving tire elements including bead wires and fabric plies, means on the supports for locating the bead wires, and means for applying one or more fabric plies to the spaced supports between said supports and the bead wires.

4. In a tire building machine, spaced supports for receiving tire elements including bead wires and fabric plies, means on the supports for locating the bead wires, and means for applying one or more fabric plies circumferentially to the spaced supports between said supports and the bead wires.

5. In a tire building machine, spaced supports for receiving tire elements, means on the supports for locating certain of the tire elements, means for applying additional tire elements to the spaced supports between said supports and previously applied tire elements, and means for applying tension against the tire elements.

6. In a tire building machine spaced supports for receiving tire elements, means on the supports for locating certain of the tire elements, means for applying additional tire elements circumferentially to the spaced supports between said supports and previously applied tire elements, and means for applying tension against the tire elements.

7. In a tire building machine, spaced supports for receiving tire elements including bead wires and fabric plies, means on the supports for locating the bead wires, means for applying one or more fabric plies to the spaced supports between said supports and the bead wires, and means for applying tension against the bead wires.

8. In a tire building machine, spaced supports for receiving tire elements including bead wires and fabric plies, means on the supports for locating the bead wires, means for applying one or more fabric plies circumferentially to the spaced supports between said supports and the bead wires, and means for applying tension against the bead wires.

9. In a tire building machine, spaced supports for receiving tire elements including bead wires and fabric plies, means on the supports for locating the bead wires, means for applying one or more fabric plies to the spaced supports between said supports and the bead wires, and means for applying tension independently against each bead wire.

10. In a tire building machine, a pair of pulleys positioned in spaced relation for receiving tire elements including bead wires and fabric plies, each of said pulleys having grooves in the surface thereof for locating bead wires and maintaining same in spaced relation axially of the pulleys, and means between the pulleys and within the reaches thereof for applying fabric plies tangentially of the pulleys.

11. In a tire building machine, a pair of pulleys positioned in spaced relation for receiving tire elements including bead wires and fabric plies, each of said pulleys having grooves in the surface thereof for locating bead wires and maintaining same in spaced relation axially of the pulleys, a pair of independently supported sheaves located in the paths of the reaches of the grooves in the pulleys, and a feed roll operable between the pulleys and within the reaches thereof for applying fabric plies tangentially of the pulleys.

12. In a tire building machine, a pair of pulleys positioned in spaced relation for receiving tire elements including bead wires and fabric plies, and means extending between the pulleys and within the reaches thereof for applying fabric plies tangentially to the pulleys, said means comprising a spirally movable roller positioned diagonally relative to the axes of the pulleys.

13. In a tire building machine, a pair of pulleys positioned in spaced relation for receiving tire elements including bead wires and fabric plies, means located in a path substantially parallel to the axes of the pulleys for supplying fabric to the pulleys, and a feed roll operable between the pulleys and within the reaches thereof for laterally changing the path of the fabric.

14. In a tire building machine, a pair of pulleys positioned in spaced relation for receiving tire elements including bead wires and fabric plies, means located in a path substantially parallel to the axes of the pulleys for supplying fabric to the pulleys and means for cutting the fabric to proper length, and means between the pulleys and within the reaches thereof for laterally changing the path of the fabric.

15. In a tire building machine, a pair of pulleys positioned in spaced relation for receiving tire elements including bead wires and fabric plies, means for moving fabric in a direction toward the reaches of the pulleys, and means between the pulleys and within the reaches thereof for laterally changing the path of the fabric to a tangential relation with the pulleys.

16. In a tire building machine, a pair of pulleys positioned in spaced relation for receiving tire elements including bead wires and fabric plies, means for moving fabric in a direction toward the reaches of the pulleys, means for advancing the fabric, and means between the pulleys and within the reaches thereof for laterally changing the path of the fabric to a tangential relation with the pulleys.

17. In a tire building machine, a pair of pulleys positioned in spaced relation for receiving tire elements including bead wires and fabric plies, means for moving fabric in a direction toward the reaches of the pulleys, means for advancing the fabric, means for severing the fabric, and means between the pulleys and within the reaches thereof for laterally changing the path of the fabric to a tangential relation with the pulleys.

18. In a tire building machine, a pair of pulleys positioned in spaced relation for receiving tire elements including bead wires and fabric plies, means for moving fabric in a direction toward the reaches of the pulleys, reciprocating means for advancing the fabric by a carrying movement, means for severing the fabric, means operable by return movement of the reciprocating means for actuating the severing means, and means between the pulleys and within the reaches thereof for changing the path of the fabric to a tangential relation with the pulleys.

19. In a tire building machine, a pair of pulleys positioned in spaced relation for receiving tire elements including bead wires and fabric plies, means between the pulleys and within the reaches thereof for applying fabric plies tangentially to the pulleys, said means comprising a spirally movable roller positioned diagonally relative to the axes of the pulleys, and means on the roller for gripping the end portion of a ply of fabric and moving it into the path of one of the reaches of the pulleys.

20. In a tire building machine a pair of pulleys positioned in spaced relation for receiving tire elements including bead wires and fabric plies, means between the pulleys and within the reaches thereof for applying fabric plies tangentially to the pulleys, said means comprising a spirally movable roller positioned diagonally relative to the axes of the pulleys, means on the roller for gripping the end portion of a ply of fabric and moving it into the path of one of the reaches of the pulleys, and means for advancing the fabric for moving it into engagement with the gripping means.

21. In a tire building machine, a pair of pulleys positioned in spaced relation for receiving tire elements including bead wires and fabric plies, means between the pulleys and within the reaches thereof for applying fabric plies tangentially to the pulleys, said means comprising a spirally movable roller positioned diagonally relative to the axes of the pulleys, a shaft for supporting the roller, fabric gripping fingers on the roller, and means operable by relative movement between the shaft and the roller for gripping the fabric.

22. In a tire building machine, a pair of pulleys positioned in spaced relation for receiving tire elements including bead wires and fabric plies, means between the pulleys and within the reaches thereof for applying fabric plies tangentially to the pulleys, said means comprising a spirally movable roller positioned diagonally relative to the axes of the pulleys, means on the roller for gripping fabric, and cam means for moving the roller in a spiral path for positioning the fabric in tangential relation with the pulleys.

23. In a tire building machine, a pair of pulleys positioned in spaced relation for receiving tire elements including bead wires and fabric plies, each of said pulleys having grooves in the surface thereof for locating bead wires and maintaining same in spaced relation axially of the pulleys, a pair of independently supported sheaves located in the paths of the reaches of the grooves in the pulleys, pneumatic means for moving the sheaves in the plane of the paths of the grooves, and means between the pulleys and within the reaches thereof for applying fabric plies tangentially of the pulleys and into the nip of one of the pulleys and bead wires mounted thereon.

24. In a tire building machine, a pair of pulleys positioned in spaced relation for receiving tire elements including bead wires and fabric plies, means between the pulleys and within the reaches thereof for conveying fabric plies tangentially of the pulleys and into the nip of one of the pulleys and bead wires mounted thereon, and a stitching unit pivotally movable into substantial engagement with the surface of one of the pulleys.

25. In a tire building machine, a pair of pulleys positioned in spaced relation for receiving tire elements including bead wires and fabric plies, means for moving fabric in a direction toward the reaches of the pulleys, means having translatory motion for advancing the fabric by a carrying movement, automatic means for returning the advancing means, and means between the pulleys and within the reaches thereof for changing the path of the fabric to a tangential relation with the pulleys.

26. In a tire building machine, a pair of pulleys positioned in spaced relation for receiving tire elements including bead wires and fabric plies, means for moving fabric in a direction toward the reaches of the pulleys, means between the pulleys and within the reaches thereof for changing the path of the fabric to a tangential relation with the pulleys, a motor for driving one of the pulleys, translatory means for advancing the fabric by a carrying movement, and automatic means for returning the advancing means and for stopping the motor.

27. In a tire building machine, a pair of pulleys positioned in spaced relation for receiving tire elements including bead wires and fabric plies, means between the pulleys and within the reaches thereof for applying fabric plies tangentially to the pulleys, said means comprising a spirally movable roller positioned diagonally relative to the axes of the pulleys, and a plurality of narrow rollers rotatably mounted in a spiral path in the spirally movable roller.

28. In a tire building machine, a pair of pulleys positioned in spaced relation for receiving tire elements including bead wires and fabric plies, means located in a path substantially parallel to the axes of the pulleys for supplying fabric to the pulleys, means between the pulleys and within the reaches thereof for changing the path of the fabric, a motor for driving one of the pulleys, manual means for operating the motor, and automatic means operable by movement of the tire elements for bringing the motor to a state of rest.

29. In a tire building machine, a pair of pulleys positioned in spaced relation for receiving tire elements including bead wires and fabric plies, means located in a path substantially parallel to the axes of the pulleys for supplying fabric to the pulleys, means between the pulleys and within the reaches thereof for changing the path of the fabric, translatory means for advancing the fabric, means for severing the fabric by a carrying movement, a motor for driving one of the pulleys, manual means for operating the motor, and automatic means operable by movement of the tire elements for bringing the motor to a state of rest and for returning the means for advancing the fabric.

30. In a tire building machine, a pair of pulleys positioned in spaced relation for receiving tire elements including bead wires and fabric plies, means located in a path substantially parallel to the axes of the pulleys for supplying fabric to the pulleys, means between the pulleys and within the reaches thereof for changing the path of the fabric, translatory means for advancing the fabric, means for severing the fabric by a carrying movement, a motor for driving one of the pulleys, manual means for operating the motor, and automatic means operable by movement of the tire elements for bringing the motor to a state of rest and for returning the means for advancing the fabric, said return of the advancing means causing actuation of severing means.

DONALD A. MACDONALD.
CORNELIUS M. O'DONOHOE.